United States Patent Office 3,281,170
Patented Oct. 25, 1966

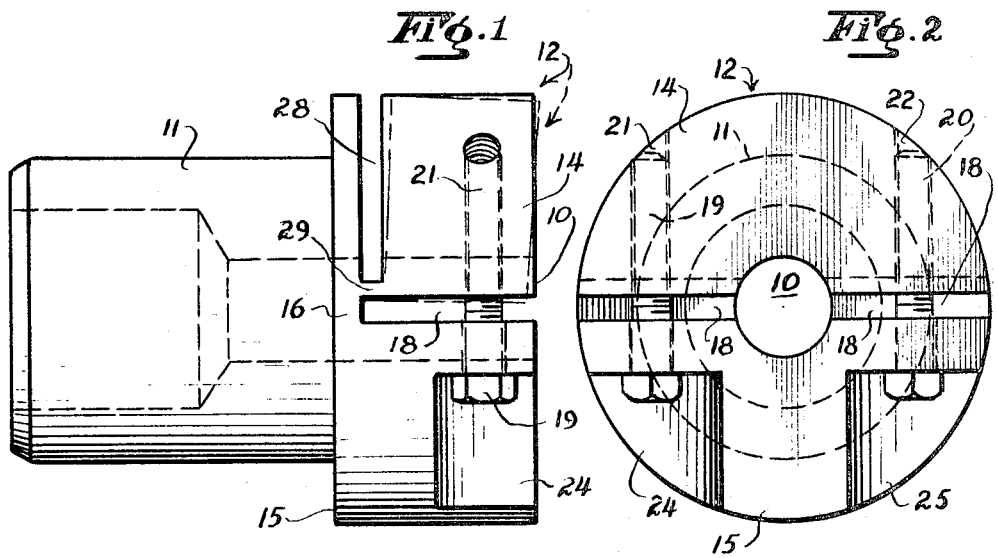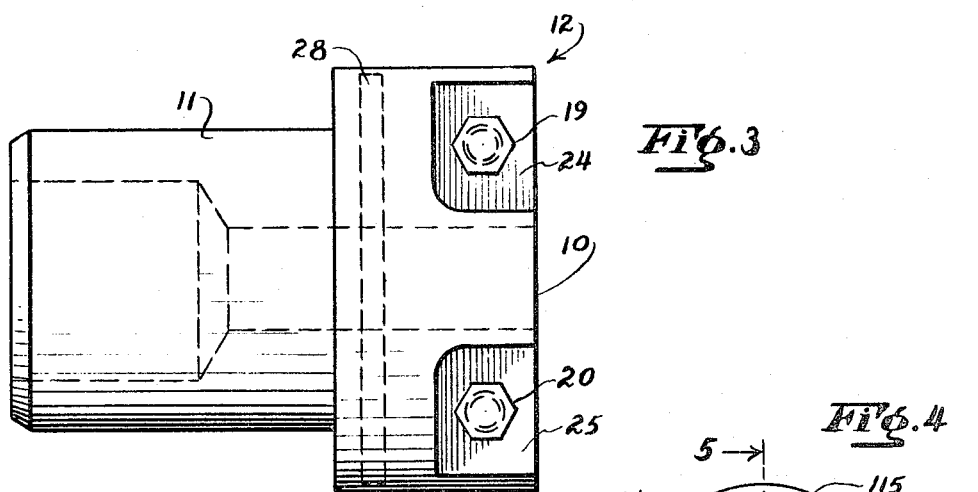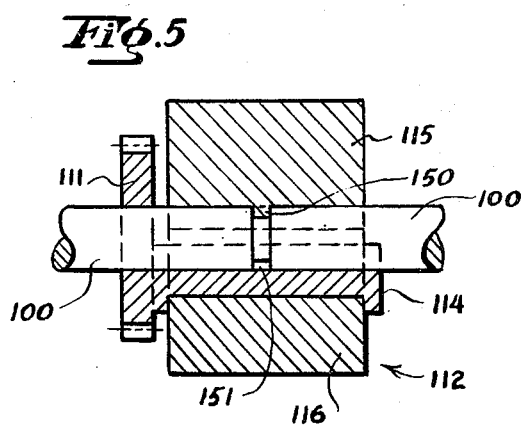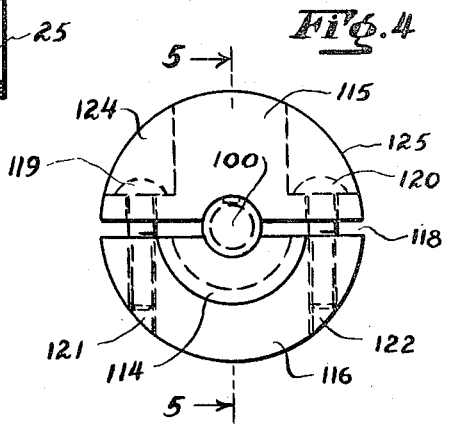

3,281,170
SHAFT CLAMP
Joseph Kaplan, 39 Fair Lane, Jericho, Long Island, N.Y.
Filed Oct. 29, 1963, Ser. No. 319,734
1 Claim. (Cl. 287—111)

The instant invention is concerned with a device which may be utilized for attaching or clamping a gear, coupling, or other similar items to a shaft, stud, or the like.

There are, at present, many conventional devices for accomplishing the above. All of the conventional apparatus, however, suffer from several disadvantages.

It is a cardinal object of this invention to provide an economical device for securing a collar to a shaft or the like.

Another primary object of the apparatus described herein is the provision of a clamp for a shaft, stud, or the like, which will secure the element to be fastened more efficiently.

A further object and accomplishment of the instant apparatus is the provision of a clamp that may be more readily mass-produced than heretofore possible.

A still further purpose of the device described herein is the provision of a shaft clamp that may be readily and easily removed without the necessity of utilizing special tools.

A still further purpose of the device described herein is to describe a shaft clamp that may be quickly and easily adjusted upon the shaft.

An ancillary object and accomplishment hereof is the description of a clamp for a shaft or the like that will not mar the said shaft when in use.

With these objects in view, the invention consists of the novel features of construction and arrangement of parts which will appear in the following specification and recited in the appended claim, reference being had to the accompanying drawings in which the same reference numerals indicate the same parts throughout the various figures, and in which:

FIG. 1 is a side elevational view of the instant invention shown applied to a conventional shaft.

FIG. 2 is a front elevational view of the device illustrated in FIG. 1.

FIG. 3 is a bottom plan view of the device illustrated in FIG. 1.

FIG. 4 is a view corresponding to FIG. 2, but showing an alternate embodiment of this invention.

FIG. 5 is a sectional view taken substantially along line 5—5 of FIG. 4.

Referring to FIGS. 1–3, there is illustrated the workings of one preferred embodiment of this invention. The illustrated embodiment is one wherein a clamp is utilized as an integral part of a coupling of a shaft of a first diameter to a shaft of a second diameter.

It is to be noted, however, that the instant device will be usable in any application wherein a clamp is required, especially a clamp for affixing a gear, a cam, a pulley, an adapter, a coupling, a hub, a wheel, or any other like device to a shaft, or the like.

Referring to the illustrative embodiment, however, there is shown at 10 a shaft of a first relatively small diameter. It is desired to affix in a rigid manner to this first shaft 10, a shaft 11 of a relatively larger diameter. To accomplish this object, a jaw clamp generally illustrated at 12, will be utilized. The said jaw clamp 12 will be an integral part of the second shaft 11.

The jaw clamp 12 portion of the illustrated invention, which is the essential portion thereof, will consist primarily of two interconnected jaws 14 and 15. The said jaws 14 and 15, although interconnected at one portion 16, will be separated by a gap 18.

In order that the jaw clamp 12 may be mounted upon the shaft 10, the said clamp 12 will be provided with a circular aperture between the jaws 14 and 15 and in the area of the gap 18. The said aperture is of slightly larger diameter than the shaft 10, so as to be able to engage the said shaft 10 prior to the tightening of the clamp 12 upon the shaft 10.

On either side of the aperture to receive the said shaft 10, there will be provided means across the gap 18 interconnecting the upper and lower jaws 14 and 15. In the illustrated embodiment of the invention, the said means will consist of a pair of locking bolts 19 and 20. One of the jaws 14 will have a pair of tapped holes 21 and 22 to receive the threaded ends of the locking bolts 19 and 20. The other of the jaws 15 will have counterbored openings 24 and 25 to receive the head ends of the locking bolts 19 and 20.

It is apparent that tightening up the locking bolts 19 and 20 will draw the jaws 14 and 15 closer together. When the locking bolts 19 and 20 are loosened, the jaws 14 and 15 will relax and will return to their original position wherein they will be loose upon the shaft 10.

The operation of the above portion of the invention will, therefore, be apparent. With the jaws 14 and 15 expanded, as a result of the locking bolts 19 and 20 being loosened, the jaw clamp 12 will be free to slide over the smaller shaft 10. When the clamp 12 is so inserted to the proper position over the shaft 10, the locking bolts 19 and 20 will be tightened thus causing the gap 18 to somewhat narrow and the jaw 14 to move to a position as shown in phantom in FIG. 1. When the jaw 14 is in this position, as a result of the tightened bolts 19 and 20, it will be apparent that the jaw clamp 12 will lock upon the shaft as is desired. The movement of the jaw clamp 14 will be described in detail immediately hereinafter.

Prior to this invention, had it be attempted to construct a jaw clamp arrangement generally as set forth herein, the results would have been unsatisfactory. One of the prime reasons for the failure would have been the mode of causing distortion of the individual jaws 14 and 15 when they are tightened by the locking bolts 19 and 20. Under ordinary circumstances, the jaws 14 and 15 would have attempted to uniformly distort. This would require great tension upon the locking bolts 19 and 20. Additionally, there would not be a secure locking upon the shaft 10.

This invention contemplates the provision of a groove 28. The said groove 28 will be perpendicular to the axis of the shaft 10 and will extend generally through the major portion of one of the jaws 14. It will, however, fall short of the gap 18 thus leaving a bridge of material 29 interconnecting the body of the jaw 14 with the remainder of the unit.

Thus, when the locking bolts 19 are tightened, drawing the upper and lower jaws 14 and 15 together, the upper jaw 14 only will distort to the position shown in phantom in FIG. 1. Of course, the magnitude of movement illustrated by this phantom position is magnified for ease of illustration. In practice, as mentioned heretofore, the same movement may amount to less than one thousandth of an inch. The movement of the upper jaw 14 only will, of course, be accomplished in view of the relatively small bridge of material 29 interconnecting the said jaw 14 with the remainder of the device. There will generally be sufficient clearance in the tapped threads of the holes 21 and 22 and the bolts 19 and 20 to permit the required degree of movement without putting undue stress upon the said bolts 19 and 20 or their tapped holes 21 and 22.

It will be apparent that this more positive movement of only one of the jaws 14 will in turn cause a more secure locking upon the shaft 10 than was heretofore available. The leading edge of the jaw 14 will tend to impinge inward upon the shaft 10, thus preventing any rotation or movement with only a minimum of tension upon the remainder of the components and upon the locking bolts 19 and 20.

This very simple provision of a weakened area 28 in one of the jaws 14 will make the device operative wherein prior attempts at this result lead to either inoperative or very cumbersome units, or units that would not fix as firmly upon a shaft as is capable with the instant device.

Adjustment of this clamp on the shaft will be relatively simple. Should such adjustment become necessary, it is only required to partially unscrew the locking bolts 19 and 20 thus allowing the jaw clamps 14 and 15 to release their grip upon the shaft 10 wherein the clamp 12 may be readjusted or removed entirely from the shaft 10. Of course, an important advantage of this invention over the prior ordinary set screws is the advantage of being able to leave the shaft intact instead of indenting and otherwise marring the shaft, as is the case with such screws.

Additional advantages and features will be apparent to those skilled in the art. For example, the double locking bolts 19 and 20 will actually provide four times the tensile force which will be exerted by only one such screw as was sometimes used in the prior art. A single screw acting upon a collar must counteract the resistance afforded by the solid section of the collar prior to clamping. In the instant invention, wherein a pair of locking bolts 19 and 20 are utilized, the total stress of each of the said bolts may be utilized to lock the jaws upon the shaft and portions of the stress in each of the bolts are not wasted on overcoming resistance to bending. Additionally, there will be apparent that it will be relatively simple to incorporate the instant invention as an integral part of the unit to be clamped, such as a pulley, a gear, or the like. When so fabricated, the two locking bolts 19 and 20 will provide a firm grip upon the shaft to which the part is to be fastened.

It is further to be noted that the design of this clamp 12 will prevent conditions of improper clamping as was heretofore possible with prior art clamps. By way of example, in prior art clamps, such as the split hub type, it will generally be possible to set the same in position too close to an adjacent shoulder wherein a good portion of the clamping force will be wasted on overcoming resistance which does not contribute to the clamping upon the shaft. In the instant device, wherein the jaws are relatively fixed in position and wherein the unit may be made integrally with the part to be clamped, such wastage of locking tension will not be possible. Still further, the unitary construction of the instant invention will insure proper alignment and concentricity of the part being clamped upon the shaft.

It will be understood that varied constructions may be provided within the scope of this invention. For example, it will be possible to eliminate the relatively small bridge of material 29 interconnecting the jaw 14 with the remainder of the device. This will insure that the said jaw 14 will be flexible as compared to the opposite jaw 15 which will remain attached to the hub of the clamp and thereby retain rigidity of the clamp for improved operation as explained in detail heretofore. Thus, the said jaw 14 will be as set forth in the embodiment described above, except that it can be removed from the remainder of the device.

Alternately, the jaw 14 may be connected to the remainder of the unit by a relatively flexible member inserted in the gap 28 and replacing or additionally adding strength to the relatively small bridge of material 29. For example, an insert of nylon or the like, in the gap 28 will serve to connect the jaw 14 to the remainder of the clamp while permitting the said jaw 14 to flex as described heretofore.

There is shown in FIGS. 4 and 5 of the instant invention, a device containing several alternate embodiments and features of the invention. The construction of the device illustrated in FIGS. 4 and 5 is the same as described in the prior embodiments except as set forth in detail hereinafter. Shown in FIGS. 4 and 5 is a shaft 100 to which it is desired to affix a gear 111. To accomplish this object, a jaw clamp generally illustrated at 112 will be utilized. Only one portion 114 of the said jaw clamp 112 will be an integral part of the gear assembly 111. In this embodiment, the said jaw clamp 112 will be comprised of two separable jaws 115 and 116 and one solid jaw 114 which, as mentioned above, will be an integral part of the said gear 111. One of the movable jaws 116 will fit around the solid jaw portions 114 which surrounds almost one half of a portion of the periphery of the shaft 100. The other movable jaw 115 will be adapted to fit about substantially the other half of the periphery of the shaft 100.

As will be evident in FIG. 4, and as in the prior embodiments of the invention, there will be a gap 118 between the upper jaw 115 and the lower jaws 114 and 116. On either side of the central aperture provided in the jaws to receive the shaft 100, there will be provided means interconnecting the said upper and lower jaws. As before, the said means consists of a pair of locking bolts 119 and 120. One of the jaws 116 will have a pair of tapped holes 121 and 122 to receive the threaded ends of the locking bolts 119 and 120. The upper jaw 115 will have counterbored openings 124 and 125 to receive the head ends of the locking bolts 119 and 120.

As in the prior embodiments then there will be apparent that tightening the locking bolts 119 and 120 will draw the jaws 115 and 114 and 116 closer together. When the locking bolts 119 and 120 are loosened, the jaws 115, 114 and 116 will relax and will return to their original position wherein they will be loose upon the shaft 110.

Thus it is that this construction will operate and accomplish the objects previously set forth. This construction will be of special advantage in that it facilitates the cutting of gears which are smaller in diameter than the hub of the shaft clamp.

There is shown in FIGS. 4 and 5 an additional feature which will be of advantage in this or any other of the previously described embodiments. One of the jaws 115 will be provided with a radially extending tongue 150 in a direction inward of the shaft 100. An annular groove 151 will in turn be provided in the shaft 100 and will be of slightly greater dimensions than that of the projecting tongue 150. Thus, the tongue 150 extends into the annular groove in the shaft 100. The tongue 150 and groove 151 arrangement provides for a high resistance to axial changes in the location of the clamp element even under high shock loads. In addition, this construction provides for accurate and sure axial positioning of the clamp element on the shaft 100.

Of course, as mentioned heretofore, any combination of the above-mentioned elements may be combined for any desired clamp operation.

As was mentioned heretofore, the clamps described herein can be utilized for any attaching purpose such as for securing gears, couplings, and many other machine parts to shafts, studs, and the like. Each one of the illustrated embodiments disclose a clamp having at least one part which is integral with the part of the element to be clamped. Further, each of the illustrated embodiments contain at least one flexible or completely separable jaw. The movable or flexible jaw or jaws will serve to draw the hub of the element and the shaft together by utilizing fastening means.

The invention set forth herein therefore provides a firm grip of an element to a shaft. It will not mar or distort the shaft even under extreme running conditions.

The solid jaw will insure precise alignment of the element being clamped under all circumstances.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claim as are stated therein, or required by the prior art.

Having thus described my invention and illustrated its use, what I claim as new and desire to secure by Letters Patent is:

A coupling comprising a tubular open ended body, a pair of diametrically opposed slots extending longitudinally inwardly from one end of said body and terminating short of the other end, a chordal slot transverse to the axis of said tubular body extending circumferentially and radially inwardly from one side of said body and having each end thereof terminating adjacent to and short of the closed end of a respective longitudinally extending slot, the body portions between the ends of said chordal slot and said diametrically opposed longitudinally extending slots being resiliently bendable, and adjustable clamping means extending across said longitudinally extending slots adjacent to the open ends thereof for drawing opposite portions of said body toward each other by effecting resilient bending of said bendable portions.

References Cited by the Examiner

UNITED STATES PATENTS

| | | |
|---|---|---|
| 279,576 | 6/1883 | Leaycraft. |
| 548,191 | 10/1895 | Griscom _____ 287—111 |
| 2,507,093 | 5/1950 | Collings _____ 287—52 |
| 2,631,313 | 3/1953 | Webber _____ 287—118 |
| 2,950,115 | 8/1960 | Hurdzan _____ 287—111 |
| 2,954,182 | 9/1960 | Bojanower _____ 287—118 X |

FOREIGN PATENTS 86,568   10/1957   Netherlands.

CARL W. TOMLIN, *Primary Examiner.*

THOMAS F. CALLAGHAN, *Examiner.*

A. V. KUNDRAT, *Assistant Examiner.*